May 14, 1968  R. L. KUSS  3,382,984
FILTER CONSTRUCTION
Filed Oct. 4, 1965
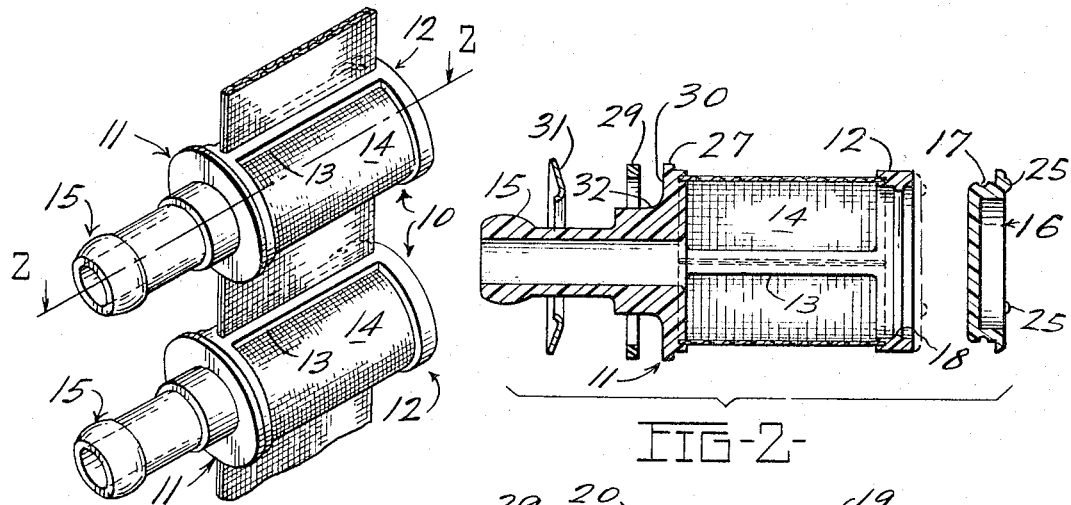
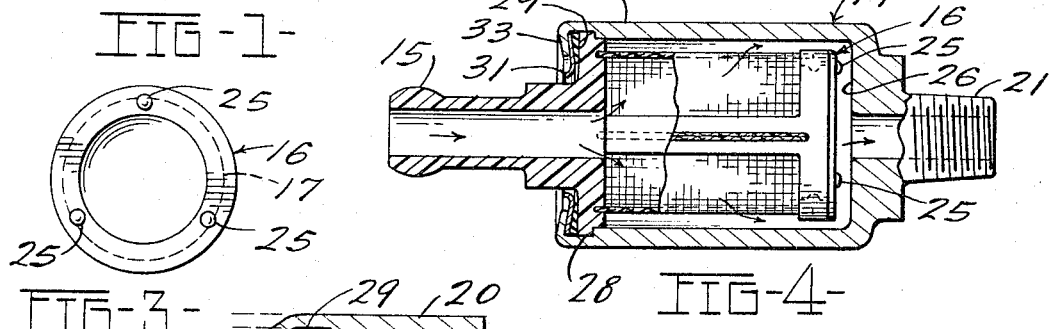
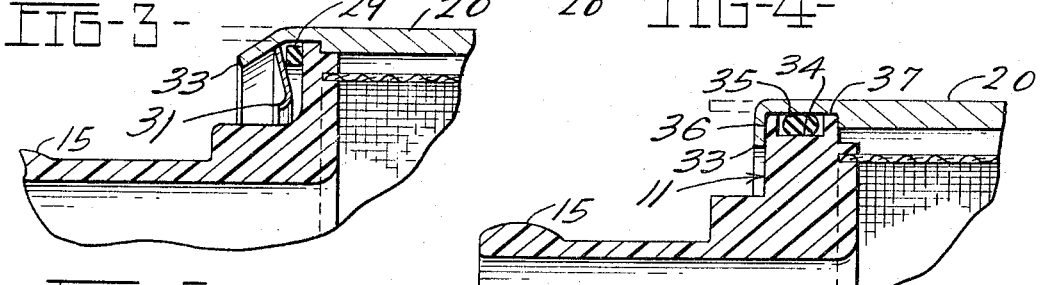
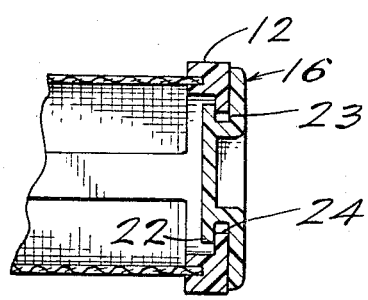
INVENTOR:
RALPH L. KUSS.
BY
ATT'YS.

United States Patent Office 3,382,984
Patented May 14, 1968

3,382,984
FILTER CONSTRUCTION
Ralph L. Kuss, Findlay, Ohio, assignor to R. L. Kuss &
Co., Inc., Findlay, Ohio, a corporation of Ohio
Filed Oct. 4, 1965, Ser. No. 492,685
6 Claims. (Cl. 210—448)

ABSTRACT OF THE DISCLOSURE

A liquid filter comprising a hollow outer body and a filter element within the body. The body has an open end and a closed end. The filter element comprises spaced apart end plates joined by reinforcing members and a screen encircling the plates and embedded in the edges of the plates and reinforcing members. The filter element is held within the body by securing one end plate to the edges of the open end. The other end plate includes a removable cap which can be displaced to allow direct liquid flow from the filter inlet to the outlet.

This invention relates to a filtering apparatus for hydrocarbon fuels and other liquids which may be installed in a liquid supply line. More specifically, this invention relates to a construction for a filtering apparatus which includes an outer casing and an inner concentric filtering cage in which the filter screen is generally parallel to the outer walls of the casing to provide a large filtering area relative to the size of the casing.

The advantages of elongate, cylindrically shaped filter screens within a generally cylindrical housing in order to increase the filtering surface area and thus decrease the pressure drop therethrough, as opposed to a flat, disc-like screen placed directly across the path of fluid flow, are well known in the art. In the automotive field, particularly for in-line fuel filters which necessarily require maximum filter screening area and a minimum of external dimension, the use of such cylindrically shaped filter screens within a correspondingly shaped housing is particularly advantageous.

It is also necessary in automotive installations to provide a filter construction in which the filter screen is corrosion resistant, shock and vibration resistant and will withstand severe temperature change, as from —20° to over 300°, as when heated by a hot manifold in warm weather.

Cylindrical filter screens within a correspondingly shaped body have been used in stationary installations where shock, vibration, temperature change, chemical attack and corrosion do not present problems. In such installations, the filter screen itself, when composed of metallic screen wire, etc., has sufficient rigidity to maintain its shape when anchored at one end within the filter housing. U.S. Patent No. 2,835,391 discloses such a construction for use in refrigeration systems.

It has been found desirable in fuel filtering installations, such as inline fuel filters in automobiles, to use, as a filter screen, woven thermoplastic material such as nylon, Saran, etc. which are heat, corrosion, shock and chemically resistant. One difficulty, however, has been the problem of providing sufficient rigidity to the cylindrical screen body which has necessitated the provision of elaborate means for reinforcing the body of the cylindrical screen in the housing.

Accordingly, it is an object of this invention to provide a filtering apparatus having a generally cylindrical filtering surface positioned within a correspondingly shaped outer housing, which filtering surfaces have sufficient structural strength to withstand thermal and mechanical stresses.

It is another object of this invention to provide an in-line type fuel filter for automotive installations, which filter has a relatively high filtering area in relation to the external size of the filter housing.

It is yet another object of this invention to provide a filter construction for hydrocarbon fuels and the like which has a large filtering area in relation to the external size of the filter housing and which may be economically manufactured from thermoplastic materials which are resistant to thermal, mechanical and vibrational forces.

Other objects and advantages of the invention will be apparent from the following detailed description of a preferred embodiment thereof, reference being made to the accompanying drawings, in which:

FIGURE 1 is a view in perspective of a pair of filter elements of this invention, illustrating one method of their manufacture which provides reinforcing elements to strengthen the dimensional stability of the cylindrical filtering surface;

FIGURE 2 is a cross-sectional view taken along line 2—2 of FIGURE 1, showing in cross section the filter element of this preferred embodiment and also showing, in cross section, a frusto-conical washer, a resilient gasket, and an end cap which are part of the complete filter construction shown in FIGURE 4;

FIGURE 3 is a plan view of the end cap shown in FIGURE 2, and illustrating the position of outwardly extending projections on the outer surface thereof;

FIGURE 4 is a cross-sectional view in elevation of a complete filter apparatus of this invention, showing a filter insert and elements of FIGURE 2 as they would be associated with an outer filter housing;

FIGURE 5 is a cross-sectional view, on an enlarged scale, showing the details of the manner of securing the filter insert of FIGURE 2 in the filter housing of FIGURE 4;

FIGURE 6 is a view similar to FIGURE 5 but showing another apparatus for securing the filter insert in the filter housing; and FIGURE 7 is a cross-sectional view of an alternate method of securing the end cap shown in FIGURES 2 and 3 to the filter insert.

One of the important features of this invention is a reinforcing cage or framework for holding the tubular filtering surfaces in fixed relationship within the filter housing. Referring to FIGURE 1, a filter insert, generally designated by reference numeral 10, includes a pair of annular, spaced apart plates 11 and 12 which are joined by at least one axially extending reinforcing member or rib 13. The filter material or screen 14 is secured to and embedded in the adjacent surfaces of the plates 11 and 12 and ribs 13, as clearly seen in FIGURE 1. An elongate nozzle 15 having a fuel passage therein, extends from the plate 11 and provides means for attaching the filter to a fuel line.

The filter insert construction previously described may be conveniently fabricated from thermoplastic materials, such as nylon. When the material comprising the plates 11 and 12, rib 13 and nozzle 15 is compatible with the material comprising the screen 14, the entire insert may be injected molded whereby the edges of the screen 14 are embedded into the adjacent surfaces of the plates 11 and 12 and ribs 13. In the illustration of FIGURE 1, the filter inserts are formed upon a pair of adjacent parallel strips of screen material, each strip assuming a semi-circular configuration opposite the other to form the cylindrical filtering area with a pair of ribs 13 and 14 extending above and below the cylindrical area to mold the two strips of screen material together. Upon completion of the injection molding process, the strips are cut off adjacent the outer surface of the ribs 13. Thus, it will be seen that the ribs 13 form the dual function of sealing together the edges of the two strips of screen material to form a cylindrical filtering area and also to provide dimensional stability to this area, so that the filter may be secured within the housing in the manner shown in FIGURE 4, with only the outer surfaces of the plate 11 contacting the housing.

Referring to FIGURES 2 and 3, an end cap 16 with a diameter substantially the same as the inside diameter of the annular plate 12 is provided with a radially extending circumferential groove 17. The radially inner surface of the annular plate 12 has projecting tongue or ring 18 which is complementarily shaped to snap within the groove 17 on the end cap 16 to hold the end cap upon the filter insert 10, as shown in FIGURE 4. Due to the resiliency of the material comprising the annular plate 12, an effective fluid seal between the groove 17 on the end cap 16 and the ring 18 on the annular plate 12 is made. When the filter insert 10 is installed in an outer housing 19, as shown in FIGURE 4, the fluid flow therethrough is in the direction indicated by the arrows. The housing 19 includes an outer shell 20 and a threaded bushing 21 through which a fluid passage extends. When the filter apparatus of this invention is used in an automotive system, the bushing 21 may be screwed directly into the automobile carburetor and a fuel line leading from the fuel pump is attached directly to the nozzle 15 on the other end of the filter.

Another method of attaching the end cap 16 to the annular plate 12 is illustrated in FIGURE 7. In this embodiment, the end cap 16 has a circular return flange 22 which is separated from the body of the end cap by a groove 23. The annular plate 12 has a radially extending ridge 24 which is slightly wider than the width of the groove 23 in the end cap 16. The diameter of the circular return flange 22 is slightly greater than the distance between the opposed edges of the ridge 24 on the annular plate 12 so that the return flange 22 may be pushed past the ridge 24, as shown in FIGURE 7, and the end cap 16 is held tightly against the opposed adjacent surfaces of the annular plate 12, due to the fact that the width of the ridge 24 is slightly larger than the width of the groove 23 in the end cap.

In place of the end cap 16, a second generally cylindrical filter insert (not illustrated) may be snapped inside the insert 10 with its filter area parallel to but inside the filter screen 14. With the inner end of the second filter insert closed and the outer end open, the effective filter area is nearly doubled with no increase in external size of the housing 19.

One advantage of the filter of this invention afforded through use of the end caps 16, which are snapped upon the filter insert 10, is that the end caps can be manually removed from the filter insert 10, should the screen 14 of the filter become entirely coated or clogged with sediment or other impurities. For instance, in an automotive installation, should the filter screen 14 become clogged, the operator may remove the fuel line from the nozzle 15 and slip a long narrow instrument through the fuel passage in the elongate nozzle 15 into the filter and, by pushing against the inner surface of the end cap 16, completely remove the end cap by pushing it to the right, as shown in FIGURE 4. Removal of the end cap would permit unfiltered fuel to flow directly through the filter apparatus to the automobile carburetor, thus enabling the driver to proceed to a service station to replace the filter or clean the gas tank. Without such removable end cap, it would be necessary to completely remove the filter housing from the system and provide means for attaching the fuel line taken from the nozzle 15 directly to the carburetor.

A number of small projections 25, as seen in FIGURES 2, 3 and 4, on the outer surface of the end cap 16, serve to prevent the end cap from seating tightly against the opposed inner wall of the housing, designated by reference numeral 26, should the end cap be removed in the manner previously described. Without such projections 25, the end cap might completely block the flow of fuel to the passage 22 when the end cap 16 is deliberately dislodged.

Various means may be used to attach the filter insert 10 within the housing 19. Referring to FIGURES 2, 4 and 5, a radially enlarged flange 27 extends from the plate 11 and fits upon a land 28 in the inner surface of the housing 19. A flat annular gasket 29 is circumjacent the nozzle 15 and is adjacent the outer, lefthand surface 30 of the plate 11. An annular, frusto-conical shaped washer 31 is also circumjacent the nozzle 15 and is held in contact with a shoulder 32 between the annular plate 11 and the nozzle 15 by an inturned crimped edge 33 of the shell 20 of the housing 19, as seen in FIGURES 4 and 5. Because of the shape of the frusto-conical washer 31, the force upon this washer exerted by the crimped edge 33, as it is bent inwardly upon the washer 31, as shown in FIGURE 5, is exerted upon the shoulder 32 of the filter insert 10. As movement of the washer 31 continues to the right, the gasket 29 is pushed, by the inclined surface of the washer 31, radially outwardly against the adjacent faces of the shell 20 and the surface 30 of the plate 11. This is important in that only minor stresses are placed upon the flange 27 by the crimped edge 33 and the gasket 29 is forced radially outward to completely seal the junction between the flange 27 and the inner surface of the shell 20. The final configuration of these components is shown in FIGURE 4, after the edges 33 have been completely crimped to an angle of more than 90° upon the frusto-conical washer 31.

FIGURE 6 shows an alternate embodiment in which the annular plate 11 has an annular groove 34 for seating an O-ring 35 which acts as the sealing member between the plate 11 and the shell 20. The edge 33 of the housing 19 is crimped tightly upon the plate 11 and a small amount of distortion of the lips 36 and 37 on either side of the O-ring will force the O-ring against the adjacent surface of the shell 20 to insure an effective fluid tight seal.

It will be seen that using either of the methods of attaching a filter insert 10 to the housing 19, the filter insert including the screen 14 is securely held within the housing 19 without touching or being supported by other surfaces. As previously explained, the reinforcement provided by the ribs 13 and annular plate 12 are sufficient to hold the filtering screen in place against thermal and mechanical disturbances.

It is also contemplated that ultrasonic sealing methods can be used to non-removably attach the end cap 16 to the annular plate 12 and also the entire filter insert 10 may be ultrasonically sealed to a thermoplastic housing 19, thus obviating the need for crimping, etc. previously described.

Various modifications of the above described preferred embodiment of the invention will be apparent to those skilled in the art and it is to be understood that such modifications can be made without departing from the spirit and tenor of the accompanying claims.

I claim:

1. In a fuel filter having a generally cylindrical filter insert with a foraminous wall positioned within an outer cylindrical housing, with said housing having a fuel inlet and a fuel outlet on opposite ends thereof, the improvement comprising a first open end on said foraminous filter insert aligned with said fuel inlet of said housing and a second closed end on said foraminous filter insert adjacent the outlet end of said housing, said closed end comprising a removably secured closure cap adapted to be removed from said filter insert by axial displacement toward said fuel outlet whereby said filter insert may be opened for direct flow of fuel therethrough by insertion of an elongate tool through said fuel inlet to exert a displacing force upon said closure cap.

2. The fuel filter of claim 1 in which the outer surface of said closure cap and the opposed inner surface of said outer housing circumjacent said fuel outlet are held apart when said closure cap is removed by a plurality of axially extending projections.

3. The fuel filter of claim 1 in which the radially inner surface of said second end of said cylindrical filter insert and the radially outer surface of said closure cap have complementarily shaped tongue and groove projections whereby said closure cap is removably secured upon said second end of said cylindrical filter insert.

4. The fuel filter of claim 1 in which said first open end on said cylindrical filter insert includes a radially extending annular flange adapted to seat upon a complementarily shaped annular flange on the adjacent surface of said outer cylindrical housing and which further includes an annular resilient gasket and an annular frusto-conical rigid washer compressed against said flanges of said insert end and said cylindrical housing with the radially inner portions of said frusto-conical washer adjacent the outer surface of said end of said filter insert and the peripheral portions of said frusto-conical washer adjacent the outer edges of said outer housing and spaced from said filter insert by said resilient gasket whereby, when said outer edges of said housing are crimped upon said frusto-conical washer, said flanges are urged into engagement by forces exerted upon said outer surface of said end of said filter insert by the radially inner portions of said frusto-conical washer and whereby said resilient gasket is partially compressed to seal the adjacent areas of said filter insert end, said outer housing, and said frusto-conical washer.

5. In a filter adapted for installation in a fluid supply line and including a hollow outer housing having a fluid outlet passage in one end and a fluid inlet passage in the other end, the improvement comprising a molded filter insert secured within said outer housing, said insert including a pair of spaced apart annular plates with the first of said plates secured to the fluid inlet end of said outer housing and the second of said plates positioned adjacent to but spaced from the fluid outlet end of said body and at least one reinforcing rib extending between said annular plates, a filter screen extending around the periphery of said annular plates and embedded therein and throughout said reinforcing rib to form a hollow filter insert within said outer housing and a cap member removably secured to the second of said annular plates, said second annular plate being spaced from the opposed fluid outlet passage in said outer housing a distance at least as great as the width of said cap whereby, when said cap is removed from said other annular plate by displacing said cap member away from said second annular plate and toward said fluid outlet, fluid will flow around said removed cap and into said fluid outlet passage.

6. A filtering apparatus comprising, in combination, a hollow, generally cylindrical outer housing having one end closed with a fluid passage therein and the other end open, a hollow, generally cylindrical filter insert secured within said housing, said filter insert having a first generally circular annular plate with an outwardly extending annular flange crimped between the edges of said open end of said housing and a rigid annular member circumjacent said first circular plate, a second generally circular plate axially spaced apart from said first plate toward said closed end of said housing, at least one elongate reinforcing member secured to and extending between said first and second spaced apart plates and a tubular screen of filtering material extending between said plates and embedded through the length of said reinforcing member and throughout the circumference of said first and second plates whereby fluid entering one end of said housing must pass radially through said tubular screen of filtering material prior to exiting the opposite end of said housing.

References Cited
UNITED STATES PATENTS

| | | | |
|---|---|---|---|
| 1,348,536 | 8/1920 | Billings et al. | 210—452 |
| 2,644,586 | 7/1953 | Cutter. | |

FOREIGN PATENTS

| | | |
|---|---|---|
| 1,143,840 | 4/1957 | France. |
| 1,363,197 | 5/1964 | France. |
| 741,918 | 12/1955 | Great Britain. |

SAMIH N. ZAHARNA, *Primary Examiner.*

FRANK W. MEDLEY, *Examiner.*